Jan. 17, 1950 — C. B. LEAPE — 2,495,172
SYNTHETIC WIRE ENAMELS AND CONDUCTORS
INSULATED THEREWITH
Filed March 27, 1946

Polyester-Amide Enamel / 12   Conductor / 10

Glass Fibers Impregnated With Polyester-Amide Composition.

Insulation Coating Comprising Polyester-Amide Enamel.

WITNESSES:

INVENTOR
Charles B. Leape.
BY
Ezra W. Savage
ATTORNEY

Patented Jan. 17, 1950

2,495,172

UNITED STATES PATENT OFFICE 2,495,172

SYNTHETIC WIRE ENAMELS AND CONDUCTORS INSULATED THEREWITH

Charles B. Leape, Wilkinsburg, Pa., assignor to Westinghouse Electric Corporation, East Pittsburgh, Pa., a corporation of Pennsylvania Application March 27, 1946, Serial No. 657,554

14 Claims. (Cl. 174—121)

This invention relates to synthetic resins which are particularly suitable for application to metallic conductors for producing an enameled insulation thereon.

The synthetic resins of this invention, while suitable for many coating, impregnating, and other applications, have been found to be peculiarly adapted for producing insulated enameled wire. Those skilled in the art are well acquainted with the fact that the requirements of an enameled coating on wire are so severe and critical that it is believed there is no application of resinous materials which sets as high a standard of requirements to be met as does enameled wire.

The enamel coating on wire must be both tough and hard in order to withstand the severe mechanical abuse met in use. Coils are usually wound from insulated enameled wire at high speed and under considerable unit pressure. The enamel must withstand the bending and the heavy unit pressures encountered without disrupting from the wire or cracking. In many cases, the conductor is severely deformed by such operations. In automatic coil-winding machines, insulated enameled wire is twisted, stretched and bent at high speeds, so that the copper wire is often elongated as much as 10%. A good enamel coating must withstand such abuse in the winding machines without failure. Coils are often manually wound into the slots of the armatures and stators of motors and generators, during which operation the enameled wire is pounded into place, in order to fill the slots completely. The enamel coating on the wire must be capable of withstanding such treatment without failing.

After the winding is completed, the motor armatures and stators may be subjected to an impregnation in hot varnish at temperatures of 100° C. or higher. The enamel coating must be capable of withstanding the action of the hot solvents and other varnish ingredients. Likewise, the enamel coating on wire is required to be proof against the action of oils, greases, water, dust, and various atmospheres which may be encountered in industry. In refrigerator motors the enameled wire is subject to continuous immersion in refrigerants, such for instance, as dichlorodifluoromethane. It will be apparent that the commercial application and subsequent use of enameled wire constitutes a most exacting test of both the physical and chemical properties of the enamel, which must be met by a satisfactory enamel.

Other conditions must be met by a resinous composition before it can be considered entirely satisfactory for application to wire to produce an insulating enamel coating. It must be capable of being dissolved in commercially available solvents and produce solutions having a relatively high solids content without excessive viscosity. The solution of resin, when applied to wire, should be capable of being satisfactorily baked or heat-treated within a reasonably wide range of temperatures in the process of producing the insulating wire. The applied baked coating of resin should be smooth and free of pin holes or flaws. Furthermore, a thin coating should possess a high dielectric strength and have other desirable electrical properties.

In evaluating coatings of enamel on a wire, the art has accepted certain tests as indicative of the merit of such enamels. The primary test employed by the art today is designated as the scrape value. The scrape value is determined by passing the enameled wire under a loaded knife-edge, and increasing the load until it is sufficient to cause the knife-edge to cut through the enamel, this last load being designated as the scrape value. It is believed that the scrape testing machine disclosed in C. B. Leape Patent 2,372,093 gives the most accurate scrape values of any device known at the present time, being reproducible to within one ounce. The values indicated hereinafter have all been determined with the machine. It may be stated that any commercially usable enameled wire should have a scrape value of at least 15 ounces and preferably higher than 20 ounces for size 20 wire and proportionate values for other wire sizes. Values of 30 ounces and higher for wire of the order of size 20 are exceptional. The scrape test may also be conducted to indicate the solvent and hot-varnish resistance of the enameled wire. The change in scrape value after subjecting the enameled wire to the action of various solvents indicates the resistance of the resin to the solvents.

Others tests have been applied to enameled wire to indicate certain desirable characteristics. The "quick-jerk" test is applied to enameled wire by giving the wire a quick jerk to cause it to break. The enamel should be substantially continuous, without exhibiting cracks, up to the point of the break. The "heat-shock" test consists in winding a coil over a conical mandrel or a mandrel having various diameters the smallest diameter being the same as the wire being tested, and placing the coil in an oven at elevated temperature. The smallest diameter mandrel that the wire can be wound on without cracking after placing in the oven is an indication of the relative abuse that the wire can stand in service. Electrical tests to indicate dielectric strength are employed to indicate the relative insulating merits of the resin coatings.

The object of the invention is to provide a synthetic resin capable of application to wire or conductors as an insulating enamel and which possesses isotropic characteristics adapting it to the uses to which enameled wire is subjected.

A further object of the invention is to provide conductors insulated with an isotropic polyesteramide type resin.

Another object of this invention is to provide a polyester-amide type of resinous composition which, when cured, is highly isotropic and substantially free from crystallinity or fiber structure, both in the stretched and in the unstrained condition.

Other objects of the invention will, in part, be obvious and will, in part, appear hereinafter.

For a fuller understanding of the nature and objects of the invention, reference should be had to the following detailed description and drawing, in which.

Figure 1:
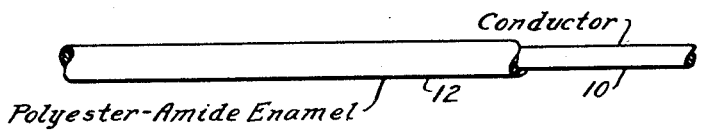
Figure 1 is a fragmentary view, in elevation, partly broken, of an enameled conductor.

The synthetic resins of this invention are unique isotropic polyester-amide type products prepared by reacting a combination of unsaturated and saturated dicarboxylic acids, polyhydric alcohol and aliphatic diamine. The unsaturated dibasic acid is selected from the group consisting of maleic acid, fumaric acid, maleic anhydride and the monomethyl substitution derivatives for the non-carboxyl hydrogens thereof. Citraconic acid and citraconic anhydride are examples of such monomethyl derivatives. In combination with the unsaturated dibasic acid is a lesser molar amount of saturated aliphatic dicarboxylic acid, selected from dicarboxylic acids having from 1 to 12 non-carboxyl carbon atoms, and including at least 25 mole-percent of succinic acid. Reacted with the combination of dicarboxylic acids are a hydrocarbon primary diamine selected from the group consisting of ethylene diamine and propylene diamine, and a saturated polyhydric alcohol, the major proportion of which is a saturated glycol. Suitable polyhydric alcohols are ethylene glycol, propylene glycol, diethylene glycol, hexamethylene glycol, glycerol and pentaerythritol.

In producing the resin, the unsaturated dibasic acid and saturated dibasic acid in an amount totaling from 7.2 to 8.8 moles are reacted with the aliphatic diamine and polyhydric alcohol totaling the same number of moles or with a molar excess of up to as much as a third more.

In producing compositions suitable for use as wire enamels in accordance with the teachings of this invention, it is desirable that certain relationships be maintained between the ingredients in order to secure the optimum properties. In general, the saturated dicarboxylic acid may be either a single acid or a mixture of several dibasic acids having from 1 to 12 non-carboxyl carbon atoms selected to provide an average of from 2 to 3½ non-carboxyl carbon atoms per dibasic acid molecule. However, at least 25 mole-percent of the saturated dibasic acid should be succinic acid, since succinic acid appears to be critical in securing satisfactory enamel coatings.

More specifically, exceptionally good synthetic resins are prepared from about 4.25 to 5.9 moles of the unsaturated dibasic acid, such as maleic anhydride, and from 2 to 4.8 moles of a saturated dibasic acid of which at least 25 mole-percent is succinic acid. Good results have been obtained with only succinic acid as the saturated dibasic acid. From 2.1 to 2.65 moles of either ethylene diamine or propylene diamine or a mixture of both is combined with from 5 to 6.75 moles of a glycol or a mixture of polyhydric alcohols of which the major proportion is a glycol.

The following example is indicative of a mode of preparation of the synthetic polyester-amide resins of this invention:

*Example I*

|  | Moles |
|---|---|
| Maleic anhydride | 5.34 |
| Succinic acid | 1.33 |
| Adipic acid | 1.33 |
| Ethylene glycol | 5.6 |
| Ethylene diamine | 2.4 | were reacted by placing the first four ingredients in a reaction vessel equipped with a thermometer, stirring means, gas inlet tube, an outlet tube for removing water liberated during the reaction, and a dropping funnel. After the four ingredients had been stirred into a uniform mixture, the ethylene diamine was added to the solution slowly from the dropping funnel with rapid stirring. The rate of addition of the ethylene diamine was so adjusted that approximately ten minutes were required to add it to the reaction vessel contents. An exothermic reaction occurred during the addition of the ethylene diamine which caused the temperature to rise from 100° C. to 115° C. After the addition of ethylene diamine was completed, the reaction vessel was heated externally so that the temperature rose slowly. At about 130° C., water vapor was given off and was swept out by a flow of nitrogen gas admitted to the interior of the reaction vessel through the gas inlet tube. The heat input was so adjusted that, after approximately two to eight hours, a temperature of 150° C. was reached. Good results are secured if a period of six hours is taken to reach 150° C. The rate of rise of temperature was maintained at this rate, or even at a somewhat slower rate, until the reaction product reached a maximum temperature of about 170° C. to 175° C. At this point, the ball and ring temperature of the resinous reaction product was from 45° C. to 90° C. The reaction was then terminated by diluting the resinous reaction product with a solvent in an amount sufficient to produce a composition having about 50% to 60% resin solids. The relatively concentrated resin solution was then cooled rapidly to room temperature.

Various solvents may be employed for dissolving the polyester-amide reaction product to produce a solution thereof. Suitable solvents are diacetone alcohol, cresol, equal parts of a cresol and ethyl mixture, equal parts of a cresol and petroleum fraction boiling in a temperature range of from 50° C. to 75° C., and mixtures of cresol with ethyl lactate, solvent naphtha, tetrachloroethane, ethylene dichloride, trichlorbenzene or monochlorotoluene. This list is merely exemplary and not limiting since numerous other organic liquids and various mixtures of organic liquids may be employed as solvents.

The 50% to 60% resin solids solution removed from the reaction vessel may be diluted to any suitable concentration or viscosity according to the requirements of subsequent application. A solution having a concentration as little as 5% resin solids may be employed for spray painting or other impregnating or coating applications. Solutions of a concentration as high as 60% may be prepared, though the viscosity is rather high and the solutions may be difficult to apply to members.

The resinous reaction product of Example I has been prepared as a wire enamel by dissolving it in a mixture of equal parts of ethyl alcohol and cresol to a concentration of approximately 25% solids. The solution was applied to No. 20 copper wire and cured satisfactorily by baking in an enameling tower in a temperature range of from 425° C. to 485° C. Enameled wire made in this range of temperatures has been found to be superior in nearly all properties to any commercial enameled wire now available. The scrape value of the enamel coating was from 32 to 33 ounces. After immersion in toluene for 48 hours, the enameled wire had a scrape value of from 28 to 34 ounces—the higher scrape value being obtained with a wire baked at the higher temperatures. The hot varnish test of the enameled wire prepared in accordance with this invention gave certain extraordinary results. After immersion in hot varnish, at a temperature of 125° C. for 48 hours, the scrape values had increased to from 38 to 39 ounces. Since all known enamels decrease in scrape value after immersion in hot varnish, this result is unexpected. The dielectric strength of the enameled wire varied from 4000 to 6200 volts per mil. Both the quick-jerk and the heat-shock tests were passed with success, indicating high flexibility, outstanding adherence to the metal wire and thermal stability. The solvent resistance of the enameled wire was outstanding. Immersion in refined petroleum oil dielectric liquids and chlorinated diphenyl base dielectric liquids did not appreciably affect the enameled coating.

The reactants of Example I may be varied from 5 to 5.75 moles of maleic anhydride, from 1.2 to 1.5 moles each of adipic and succinic acids, from 2.1 to 2.65 moles of ethylene diamine and from 5 to 6.75 moles of ethylene glycol, the acids being balanced to produce the same molar total and the diamine and glycol being similarly balanced. The resins produced within this range of proportions will be found to possess properties equal to or only slightly inferior to the resin of Example I.

The order of reaction of the ingredients of Example I is not particularly critical. For example, the diamine may be reacted with either of the unsaturated or saturated dibasic acids before combining with the glycol and the other acid. The rate of reaction may be increased or decreased considerably without notably affecting the product. In general, the procedure under Example I gives the best results. Obviously, the end point of the reaction may be modified to suit the intended application of the resins. The reaction may be so conducted as to carry the resins to a more advance state of polymerization, or to a lower degree of polymerization for some applications. In these ways, resins of varying degrees of toughness and flexibility may be secured, thus allowing a broad latitude in meeting various requirements.

The resinous compositions produced herein have certain highly desirable characteristics. X-ray diffraction studies indicate substantially no crystallinity. Films of this resin have been prepared in various ways and no crystallinity has been found by X-ray diffraction studies. Even when stretched, no substantial amount of crystallinity or orientation has been found. This indicates a high degree of isotropicity and homogeneity of structure. These characteristics are highly desirable, particularly for enameled wire manufacture, since the properties of the resin coating are uniform in all directions and it is non-orienting whereby no distortion or weakness develops when enameled wire is stretched, twisted, or bent.

Other examples of the resinous composition and its preparation in accordance with the present invention follow.

*Example II*

| | Moles |
|---|---|
| Fumaric acid | 5.34 |
| Succinic acid | 1.33 |
| Adipic acid | 1.33 |
| Ethylene diamine | 2.4 |
| Ethylene glycol | 5.6 |

The ingredients were reacted as in Example I, the fumaric acid replacing the maleic anhydride in that example. When the resulting resin was applied to No. 20 copper wire, the enamel coating had a scrape value of from 24 to 26 ounces. After 48 hours immersion in toluene, the scrape value was 25 to 26 ounces.

*Example III*

| | Moles |
|---|---|
| Maleic anhydride | 4.28 |
| Succinic acid | 2.4 |
| Adipic acid | 1.33 |
| Ethylene diamine | 2.4 |
| Ethylene glycol | 5.6 |

The proportions of the acids have been varied in this example from that of Example I, otherwise the reaction was carried out as in that example. After applying the resulting resin to No. 20 copper wire, the scrape value was found to be 32 ounces. After immersion for 48 hours in toluene, the scrape value was 33 ounces, and after immersion in hot varnish for 48 hours, the scrape value was 29 ounces.

*Example IV*

| | Moles |
|---|---|
| Maleic anhydride | 4.28 |
| Succinic acid | 1.33 |
| Adipic acid | 2.4 |
| Ethylene diamine | 2.4 |
| Ethylene glycol | 5.6 |

In this example, the proportions are further varied from Example I. The ingredients were reacted as in Example I and prepared into an enamel which, when applied to No. 20 copper wire, exhibited a scrape value of 26 ounces. After immersion for 48 hours in toluene, the scrape value was 24 ounces, while after immersion for 48 hours in hot varnish, the scrape value was 22 ounces.

*Example V*

| | Moles |
|---|---|
| Maleic anhydride | 5.34 |
| Succinic acid | 1.33 |
| Adipic acid | 1.33 |
| Ethylene diamine | 2.16 |
| Ethylene glycol | 5.84 |

The proportions of the ethylene glycol to the ethylene diamine were modified as compared to Example I. A wire enamel was prepared in accordance with Example I and applied to No. 20 copper wire. The scrape value of the enamel was from 25 to 28 ounces. After being immersed in toluene for 48 hours, the scrape value was still 25 to 28 ounces. The scrape value, after 48 hours immersion in hot varnish, was from 28 to 25 ounces.

*Example VI*

| | Moles |
|---|---|
| Maleic anhydride | 5.34 |
| Succinic acid | 1.33 |
| Adipic acid | 1.33 |
| Ethylene diamine | 2.40 |
| Ethylene glycol | 6.72 |

This example differs from Example I by including a 20% excess of ethylene glycol. When prepared into a wire enamel, as set forth in Example I, and applied to No. 20 wire, the scrape value was from 33 to 34 ounces. After 48 hours immersion in toluene, the scrape value remained unchanged. After 48 hours immersion in hot varnish, the scrape value was 31 to 32 ounces.

*Example VII*

| | Moles |
|---|---|
| Maleic anhydride | 5.34 |
| Succinic acid | 1.33 |
| Adipic acid | 1.33 |
| Ethylene diamine | 2.4 |
| Diethylene glycol | 2.8 |
| Propylene glycol | 2.8 |

In this example, diethylene glycol and propylene glycol replaced the ethylene glycol of Example I. When prepared into a wire enamel and applied to No. 20 wire, scrape values up to 27 ounces were exhibited.

*Example VIII*

| | Moles |
|---|---|
| Maleic anhydride | 5.34 |
| Succinic acid | 1.33 |
| Adipic acid | 1.33 |
| Propylene diamine | 2.4 |
| Diethylene glycol | 5.6 |

In this example, diethylene glycol replaced the ethylene glycol of Example I. The longer carbon-chain glycol in this example produced a softer enamel which had scrape values of up to 23 ounces.

*Example IX*

| | Moles |
|---|---|
| Maleic anhydride | 5.34 |
| Succinic acid | 1.33 |
| Adipic acid | 1.33 |
| Ethylene diamine | 2.4 |
| Ethylene glycol | 4.48 |
| Glycerol | 1.12 |

The effect of glycerol substituted for a part of the ethylene glycol of Example I is exhibited in this example. The wire enamels prepared from the composition of this example had scrape values of from 26 to 33 ounces on No. 20 copper wire.

*Example X*

| | Moles |
|---|---|
| Maleic anhydride | 4.81 |
| Succinic acid | 1.86 |
| Adipic acid | 1.33 |
| Ethylene diamine | 2.4 |
| Diethylene glycol | 1.68 |
| Ethylene glycol | 4.48 |

In this example, succinic acid replaces part of the maleic anhydride of Example I. When prepared into a varnish in accordance with the procedure set forth under Example I, and applied to No. 20 wire, scrape values of from 26 to 37 ounces were exhibited. The composition had unusual hot varnish resistance, scrape values up to 40 ounces being obtained.

*Example XI*

| | Moles |
|---|---|
| Maleic anhydride | 5.77 |
| Succinic acid | 2.23 |
| Ethylene diamine | 2.4 |
| Ethylene glycol | 5.6 |

This composition differs from Example I by eliminating the adipic acid and increasing both the maleic anhydride and succinic acid. When prepared into a wire enamel in accordance with the procedure of Example I, and applied to No. 20 copper wire, enameled coatings of considerable hardness were secured, though the coatings were not brittle. The scrape values were from 36 to 40 ounces.

The resinous polyester-amide compositions of this invention may be modified by adding thereto other compatible resinous materials. It has been found that certain benefits are often secured by such addition. Phenolic resins and alkyd resins alone, or modified with either unsaturated oils or aliphatic acids having at least 16 carbon atoms in the chain, impart benefits to the synthetic resins of this invention when incorporated in amounts equal to 2% to 100% of the synthetic resin whereby the modified or unmodified alkyds and phenolics constitute from 2% to 50% of the total. The following examples are illustrative of such additions.

*Example XII*

| | |
|---|---|
| Cresylic acid | 1 mole |
| Formaldehyde | 1 mole |
| Tung oil | 35% of the weight of the cresylic acid | were reacted in the presence of a basic catalyst to a resin in the solvent soluble stage. The product was incorporated into the resin of Example I in the proportion of 9 parts of the latter to 1 part of the tung oil modified phenol aldehyde resin. When applied to wire, enamel coatings having scrape values in excess of 30 ounces were obtained. The enamel was particularly stable even when aged for prolonged periods of time under conditions of low humidities and high temperatures, the coatings being extremely flexible under these conditions.

*Example XIII*

A linseed oil modified glycerol-phthalate resin was prepared in the proportions of 20% linseed oil and 80% glycerol phthalate. From 2 to 5 parts of the oil modified resin so produced was combined 100 parts by weight of the synthetic resin of Example I and applied to copper wire. The enameled wire produced therefrom was found to have excellent scrape values.

Referring to Figure 1 of the drawing, there is illustrated a conductor 10 composed of metal, such as copper, silver, steel, aluminum, or the like, carrying an applied coating of the present isotropic polyester-amide enamel 12. The conductor 10 may be round as illustrated, or may be of any other desirable shape, such as rectangular or flat strip, or it may be composed of twisted or braided wire, or the like. The enamel 12 may be any of the resinous composition as disclosed herein, alone or carrying various fillers, such, for example, as finely-divided mica, or silica, colored pigments or dyes. A high degree of adherence of the enamel 12 to the wire 10 is a feature of the insulated wire. The coating of enamel 12 may be of a thickness from less than 1 mil to several mils.

Another feature of the enamel coating is its exceptional thermal stability. Enameled wire, such as shown in Figure 1, has been heated to temperatures of as high as 150° C. for hundreds of hours and found to retain a substantial proportion of its electrical and mechanical properties. For example, the enamel of this invention on No. 20 wire heated for 1000 hours at 150° C. can be wound into coils of relatively small diameter without failure of the enamel.

The resinous compositions of this invention may be applied to conductors previously covered with fibrous insulating materials, such, for example, as glass fibers, asbestos fibers, cotton, silk, etc.; or the enamel may be applied initially to the conductor and the fibrous covering wrapped, woven, braided, or otherwise applied thereover.

Figure 2:
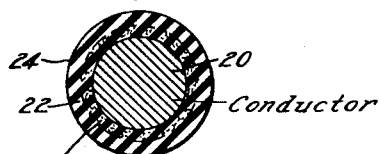
Fig. 2 is a cross-section through a conductor insulated in accordance with the invention.

Referring to Fig. 2 of the drawing, there is illustrated one embodiment of this form of the invention. The conductor 20 of copper, for example, is initially wrapped with a layer 22 of glass fibers. Thereafter, the wrapped conductor is impregnated with the isotropic polyamide-polyester wire enamel 24 disclosed herein. The fibrous material is indicated as being fully impregnated, though it will be apparent that the fibrous material may be only partially coated or impregnated with the wire enamel.

Figure 3:
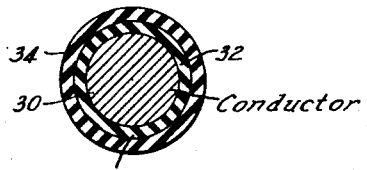
Fig. 3 is a view in cross-section of a modified form of insulated conductor.

The enamel of this invention may be employed in combination with other resinous materials. One particular advantage of the present invention is the unusual adherence of the synthetic resins disclosed herein to copper and other metallic materials. This property may be advantageously made use of, as shown in Fig. 3 of the drawing, by initially coating the conductor 30 with a layer 32 of the enamel of this invention, and thereafter applying a coating 34 of prior art or other enamels which may not have the requisite adherence to metals possessed by the coating 32. Composite insulation so produced presents many advantages for critical applications.

While the invention has emphasized the preparation of enameled wire, it should be understood that the isotropic polyester-amide compositions disclosed herein possess properties that indicate their suitability for many other applications. The coating of sheets of metal to be used for preparing containers for food, oil, and other products, is one desirable use thereof. The effect of most foods, acids, water, and other materials, is negligible on the resinous compositions after heat treatment.

Protective or decorative coatings of all types for metal, carbon bodies, ceramic materials, glass, plastic bodies and the like, may be secured by applying the resins of this composition. Fabrics and other porous or impregnable materials may be treated by coating or impregnating them with the resins disclosed herein.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. The resinous reaction product derived by heating from 4.25 to 5.9 moles of an unsaturated acidic compound selected from the group consisting of maleic acid, fumaric acid, maleic anhydride and the monomethyl substitution derivatives for the non-carboxyl hydrogen thereof, from 1 to 2.4 moles of adipic acid, from 1 to 2.4 moles of succinic acid, the three acidic ingredients totaling from 7.2 to 8.8 moles, from 2.1 to 2.65 moles of hydrocarbon primary diamine having from 2 to 3 carbon atoms per molecule, and from 5 to 6.75 moles of saturated glycol having no other reactive groups than the hydroxyl groups, the total moles of diamine and glycol being substantially equal to at least the moles of the acidic ingredients, the reaction product having a ball and ring temperature of from 50° C. to 90° C.

2. The resinous reaction product derived by heating from 4.25 to 5.9 moles of an unsaturated acidic compound selected from the group consisting of maleic acid, fumaric acid, maleic anhydride and the monomethyl substitution derivatives for the non-carboxyl hydrogen thereof, from 4.8 to 2 moles of a mixture of saturated aliphatic dicarboxylic acids having an average of from 2 to 3½ non-carboxyl carbon atoms per acid molecule, said acids being selected from the group consisting of saturated aliphatic hydrocarbon dicarboxylic acids having from 1 to 12 non-carboxyl carbon atoms, the saturated dicarboxylic aliphatic acids composed of at least 25 mole-percent of succinic acid, the moles of the acidic ingredients totaling from 7.2 to 8.8, from 2.1 to 2.65 moles of aliphatic hydrocarbon primary diamine, the aliphatic diamine having an average of from 2 to 3 carbon atoms per molecule, and from 5 to 6.75 moles of saturated glycol having no other reactive groups than the hydroxyl groups, the total moles of glycol and aliphatic diamine being substantially equal to at least the moles of the acidic ingredients.

3. The resinous reaction product derived by heating from 4.25 to 5.9 moles of an unsaturated acidic compound selected from the group consisting of maleic acid, fumaric acid, maleic anhydride and the monomethyl substitution derivatives for the non-carboxyl hydrogen thereof, from 4.8 to 2 moles of a mixture of saturated aliphatic dicarboxylic acids having an average of from 2 to 3½ non-carboxyl carbon atoms per acid molecule selected from the group consisting of saturated aliphatic hydrocarbon dicarboxylic acids having from 1 to 12 non-carboxyl carbon atoms, the saturated dibasic aliphatic acids composed of at least 25 mole-percent of succinic acid, the moles of the acidic ingredients totaling 7.2 to 8.8, from 2.1 to 2.65 moles of aliphatic hydrocarbon primary diamine, the aliphatic diamine having an average of from 2 to 3 carbon atoms per molecule, and from 5 to 6.75 moles of a mixture of aliphatic saturated polyhydric alcohols having no other reactive groups than the hydroxyl groups, the major proportion of the polyhydric alcohol mixture being glycol, the total moles of aliphatic diamine and polyhydric alcohol substantially equal to at least the moles of the acidic ingredients.

4. The resinous reaction product derived by heating from 5 to 5.75 moles of maleic anhydride, from 1.2 to 1.5 moles of succinic acid, from 1.2 to 1.5 moles of adipic acid, the three acidic ingredients totaling substantially 8 moles, from 2.1 to 2.65 moles of ethylene diamine and from 5 to 6.75 moles of ethylene glycol, the ethylene diamine and glycol totaling at least 8 moles.

5. The resin solution comprising 5 to 60 parts by weight of the reaction product of claim 4 reacted to a ball and ring temperature of from 50° C. to 90° C. and from 95 to 40 parts by weight of an organic solvent therefor.

6. The resin solution comprising from 5 to 60 parts by weight of the resinous reaction product derived by heating from 5 to 5.75 moles of maleic anhydride, from 1.2 to 1.5 moles of succinic acid, from 1.2 to 1.5 moles of adipic acid, the moles of the three acidic ingredients totaling substantially 8 moles, from 2.1 to 2.65 moles of ethylene diamine and from 5 to 6.75 moles of ethylene glycol, the ethylene diamine and ethylene glycol totaling at least 8 moles, from 2% to 100% of the weight of the resinous reaction product of a phenol-aldehyde resin and from 95 to 40 parts by weight of an organic solvent for the resins.

7. The resin solution comprising from 5 to 60 parts by weight of the resinous reaction product derived by heating from 4.25 to 5.9 moles of an unsaturated acidic compound selected from the group consisting of maleic acid, fumaric acid, maleic anhydride and the monomethyl substitution derivatives for the non-carboxyl hydrogen thereof, from 1 to 2.4 moles of adipic acid, from 1 to 2.4 moles of succinic acid, the moles of the three acidic ingredients totaling from 7.2 to 8.8 moles, from 2.1 to 2.65 moles of hydrocarbon primary diamine having from 2 to 3 carbon atoms per molecule and 5 to 6.75 moles of a saturated hydrocarbon glycol, the total moles of diamine and glycol being substantially equal to at least the moles of the acidic ingredients and from 95 to 40 parts by weight of a solvent therefor.

8. An article of manufacture comprising an electrical conductor and an insulating coating applied to the conductor, the coating comprising the heat-treated resinous reaction product derived by heating from about 4.25 to 5.9 moles of an unsaturated acidic compound selected from the group consisting of maleic acid, fumaric acid, maleic anhydride and the monomethyl substitution derivatives for the non-carboxyl hydrogen thereof, from 4.8 to 2 moles of a mixture of saturated aliphatic hydrocarbon dicarboxylic acids having an average of from 2 to 3½ non-carboxyl carbon atoms per acid molecule selected from the group consisting of saturated aliphatic dicarboxylic acids having from 1 to 12 non-carboxyl carbon atoms, the saturated dicarboxylic aliphatic acids composed of at least 25 mole-percent of succinic acid, the moles of the acidic ingredients totaling from 7.2 to 8.8, from 2.1 to 2.65 moles of aliphatic hydrocarbon primary diamine, the aliphatic diamine havig an average of from 2 to 3 carbon atoms per molecule, and from 5 to 6.75 moles of a saturated glycol having no other reactive group than the hydroxyl groups, the total moles of glycol and aliphatic diamine being substantially equal to at least the moles of the acidic ingredients.

9. An article of manufacture comprising an electrical conductor and an insulating coating applied to the conductor, the coating comprising the heat-treated resinous reaction product derived by heating from 5 to 5.75 moles of maleic anhydride, from 1.2 to 1.5 moles of succinic acid, from 1.2 to 1.5 moles of adipic acid, the three acidic ingredients totaling substantially 8 moles, from 2.1 to 2.65 moles of ethylene diamine and from 5 to 6.75 moles of ethylene glycol, the ethylene diamine and glycol totaling at least 8 moles.

10. An insulated electrical conductor comprising a metallic conductor and an insulating coating applied to the metallic conductor, the coating comprising from 2% to 50% by weight of a phenol-aldehyde resin and the balance of the coating composed of the resinous reaction product derived by heating from 4.25 to 5.9 moles of an unsaturated acidic compound selected from the group consisting of maleic acid, fumaric acid, maleic anhydride and the monomethyl substitution derivatives from the non-carboxyl hydrogen thereof, from 1 to 2.4 moles of adipic acid, from 1 to 2.4 moles of succinic acid, the moles of the three acidic ingredients totaling from 7.2 to 8.8 moles, from 2.1 to 2.65 moles of a hydrocarbon primary diamine having from 2 to 3 carbon atoms per molecule, and from 5 to 6.75 moles of a saturated glycol having no other reactive groups than the hydroxyl groups, the total moles of diamine and glycol being substantially equal to at least the moles of the acidic ingredients.

11. An insulated electrical conductor comprising a metallic conductor and an insulating coating applied to the metallic conductor, the coating comprising from 2% to 50% by weight of an alkyd resin and the balance of the coating composed of the resinous reaction product derived by heating from 5 to 5.75 moles of maleic anhydride, from 1.2 to 1.5 moles of succinic acid, from 1.2 to 1.5 moles of adipic acid, the three acidic ingredients totaling substantially 8 moles, from 2.1 to 2.65 moles of ethylene diamine and from 5 to 6.75 moles of ethylene glycol, the ethylene diamine and glycol toatling at least 8 moles.

12. An article of manufacture comprising an electrical conductor, a layer of fibrous material applied to the conductor and a coating applied to impregnate at least a part of the fibrous material, the coating comprising the resinous reaction product derived by heating from 5 to 5.75 moles of maleic anhydride, from 1.2 to 1.5 moles of succinic acid, from 1.2 to 1.5 moles of adipic acid, the three acidic ingredients totaling substantially 8 moles, from 2.1 to 2.65 moles of ethylene diamine and from 5 to 6.75 moles of ethylene glycol, the ethylene diamine and glycol totaling at least 8 moles.

13. An article of manufacture comprising an electrical conductor, a layer of fibrous material applied to the conductor and a coating applied to impregnate at least a part of the fibrous material, the coating comprising the resinous reaction product derived by heating from about 4.25 to 5.9 moles of an unsaturated acidic compound selected from the group consisting of maleic acid, fumaric acid, maleic anhydride and the monomethyl substitution derivatives from the non-carboxyl hydrogen thereof, from 1 to 2.4 moles of adipic acid, from 1 to 2.4 moles of succinic acid, the moles of the three acidic ingredients totaling from 7.2 to 8.8 moles, from 2.1 to 2.65 moles of a saturated primary hydrocarbon diamine having from 2 to 3 carbon atoms per molecule, and 5 to 6.75 moles of a saturated glycol having no other reactive groups than the hydroxyl groups, the total moles of diamine and glycol being substantially equal to at least the moles of the acidic ingredients.

14. An article of manufacture comprising an electrical conductor, a layer of fibrous material applied to the conductor and a coating applied to impregnate at least a part of the fibrous material, the coating comprising the resinous reaction product derived by heating from 4.25 to 5.9 moles of an unsaturated acidic compound selected from the group consisting of maleic acid, fumaric acid, maleic anhydride and the monomethyl substitution derivatives for the non-carboxyl hydrogen thereof, from 4.8 to 2 moles of a mixture of saturated aliphatic hydrocarbon dicarboxylic acids having an average of from 2 to 3½ non-carboxyl carbon atoms per acid molecule selected from the group consisting of saturated aliphatic dicarboxylic acids having from 1 to 12 non-carboxyl carbon atoms, the saturated dicarboxylic aliphatic acids composed of at least 25 mole-percent of succinic acid, the moles of the acidic ingredients totaling from 7.2 to 8.8, from 2.1 to 2.65 moles of aliphatic primary hydrocarbon diamine, the aliphatic diamine having an average of from 2 to 3 carbon atoms per molecule, and from 5 to 6.75 moles of a saturated glycol having no other reactive groups than the hydroxyl groups, the total moles of glycol and aliphatic diamine being substantially equal to at least the moles of the acidic ingredients.

CHARLES B. LEAPE.

REFERENCES CITED

The following references are of record in the file of this patent:

UNITED STATES PATENTS

| Number | Name | Date |
|---|---|---|
| 1,851,405 | Rosenstein, et al. | Mar. 29, 1932 |
| 2,048,778 | Brubaker et al. | July 28, 1936 |
| 2,260,024 | Hall et al. | Oct. 21, 1941 |
| 2,282,827 | Rothrock | May 12, 1942 |
| 2,349,951 | Fuller et al. | May 30, 1944 |
| 2,424,884 | Cooke et al. | July 29, 1947 |